UNITED STATES PATENT OFFICE.

FREDERICK REISSMANN, OF WEST POINT, NEW YORK.

COMPOSITION OF MATTER CONTAINING ARTIFICIAL DYE AND PROCESS OF MAKING SAME.

1,134,486. Specification of Letters Patent. Patented Apr. 6, 1915.

No Drawing. Application filed February 6, 1914. Serial No. 816,920.

*To all whom it may concern:*

Be it known that I, FREDERICK REISSMANN, a citizen of the United States, residing at West Point, in the county of Orange and State of New York, have invented certain new and useful Improvements in Compositions of Matter Containing Artificial Dye and Processes of Making Same; and I do hereby declare the following to be a full, clear, and exact description of the invention, such as well enable others skilled in the art to which it appertains to make and use the same.

This invention relates to improvements in dry black color, granulated or powdered, or in other suitable form for dyes, stains and varnishes used for numerous purposes in the arts, said black dye or powder being readily soluble in the cold in all proportions and mixtures of ethyl, methyl alcohols, acetone, amyl acetate, acetic ether, and under heat is soluble in strong acids such as glacial acetic, sulfuric and the like, in acetanilid, camphor, salicylic acid, salol, methyl salicylate, volatile and fixed oils which are soluble in alcohol, and in fact the black may be combined with any chemical either in the cold or under heat, if the latter is soluble in alcohol.

The ingredients of the dye include either one or a combination of the following essential volatile oils which give the desired result, namely, the true and artificial oil of safrol, oil of camphor, and the true and artificial oil of sassafras. The oil of sassafras is used in preference to the others as it is the most economical to use, but I wish it to be understood that I do not limit myself to the use of sassafras oil in the composition as the other oils noted may be used if preferred.

In combining the dye, equal parts by weight of the oil and bichlorid of tin (preferably in crystals) are heated in a suitable porcelain evaporating dish until the bichlorid of tin melts in the oil of sassafras, when a chemical reaction will take place causing a large volume of gas to escape and at the same time causing the comparatively small quantity of oil and bichlorid of tin in the bottom of the bowl to rise in the form of a large black shining mass. When the contents of the dish no longer rise, the reaction is complete and the dish or receptacle is removed from the heat. The contents of the bowl then slowly settle down leaving a fine black and acid proof powder readily soluble in the alcohols above enumerated.

While in my preferred formula above described for manufacturing the black powder, I use equal quantities of artificial oil of sassafras and bichlorid of tin, these proportions may be varied, if desired, to meet any requirements as will be understood; for instance the quantity of oil may be increased from one to eight ounces to one ounce of bichlorid of tin, and the reaction will still take place but obviously the composition will be more difficult to dissolve in the alcohol, except when heat is applied. I also find that by using my preferred formula, a finer powder may be produced by adding an ounce of denatured grain alcohol to the two ingredients of the compound before heating them, and further that by adding a liquid dram of chlorid of sulfur to a pint of oil of sassafras and use an ounce of this sulfurated oil to an ounce of bichlorid of tin, the reaction results in a perfectly neutral black powder easily soluble in a mixture of four ounces of acetone, six ounces of benzol and six ounces of methyl alcohol.

I have also found that acetone is the most rapid solvent for my black, either alone or in combination with alcohols. Where acetone is used alone as a solvent, the black is so fast and durable in color, that, if used for instance on paper, wood or other porous material it can not be removed even with the strongest acids.

I also find that by adding to the ingredients before reaction any one of the following chemicals in the acetanilid, salol, salicylic acid, camphor, or any gum soluble in alcohol, such as mastic, dammar, shellac, etc. in the proportion of one half the quantity of bichlorid of tin, the resulting black will form a brilliant black enamel when dissolved in acetone, said enamel being valuable for any purposes in the arts.

Many different blacks may be obtained as any solid chemical soluble in alcohol, may be added to the two ingredients named and permitted to react with them, these additional chemicals, if added, must not exceed one half the amount of bichlorid of tin used, also, any liquid soluble in alcohol, may be added to the two ingredients named, and will react with them, in any suitable quantity, usually in the proportion of 1 to 2 ounces, except in the case of the stronger mineral acids and chlorids when not more than a liquid dram should be added, excepting however, the non-mineral glacial acetic acid, of which as much as an ounce may be used.

I also desire to state that articles of manufacture, if coated with a liquid solution of my black, will become more or less non-inflammable. The black may also be placed in a glass retort and any of the alcohols cited and in which the black is soluble, added to the dry black and distilled through the same, which will make the liquids thus distilled through the black more or less non-inflammable and at the same time leave the black in the bottom of the still in a finer state than before distillation, thus making it still more valuable on account of its fineness and neutral state.

The uses to which this black may be placed when combined with various chemicals soluble in alcohol, before reaction, are many. For instance an ounce of camphor may be added to the two ingredients cited, before reaction, and the result will be a black powder smelling strongly of camphor and after being dried to remove any moisture, may be used for preserving various substances, as the powder is both acid and water proof, or a pint of acetone may be added to the black and articles then coated with the mixture in order to preserve them.

I also find that when it is desired to obtain a slower drying black than if mixed with the alcohols cited, pine oil may be substituted to suit the requirements, but that where pine oil only is used, the black must be dissolved under heat in the oil, any oil soluble in alcohol may be added but I have found pine oil to be efficient and the cheapest.

I particularly desire to emphasize that any one without "special apparatus" can conveniently and economically manufacture the black powder, as all that is needed is the chemicals, receptacle and heat, and therefore requires no expensive machinery, as is necessary for the manufacture of anilin blacks or other black dyes or pigments.

It is obvious that the desired chemical reaction may be produced by one or a combination of the several chemical constituents of oil of sassafras or oil of safrol, and therefore I do not limit myself to the use of any particular oil, as it is found in use that various vegetable oils may be substituted for those specified.

In the following claims where I use the term "an oil having as a constituent a substantial amount of oil of safrol" I wish it to be understood that I may use either oil of safrol, oil of sassafras, oil of camphor or artificial oil of sassafras or any mixture of two or more of these oils.

What I claim is:—

1. The herein described composition of matter containing an artificial dye comprising the product of reaction of a mixture containing an oil having as a constituent a substantial amount of oil of safrol, and bichlorid of tin, dissolved in a paint thinner containing acetone.

2. The herein described composition of matter containing an artificial dye comprising the product of reaction of a mixture containing bichlorid of tin and an oil having as a constituent a substantial amount of oil of safrol.

3. The herein described composition of matter containing an artificial dye comprising the product of reaction of a mixture containing bichlorid of tin and oil of safrol.

4. The herein described composition of matter containing an artificial dye comprising the product of reaction of a mixture containing bichlorid of tin and oil of safrol, dissolved in a paint thinner containing acetone.

5. The herein described composition of matter containing an artificial dye comprising the product of reaction of a mixture containing bichlorid of tin, an oil having as a constitutent a substantial amount of oil of safrol, and liquid chlorid of sulfur, dissolved in a solution of acetone, benzol and methyl alcohol.

6. The herein described composition of matter containing an artificial dye comprising the product of reaction of a mixture containing bichlorid of tin, an oil having as a constituent a substantial amount of oil of safrol, liquid chlorid of sulfur and acetanilid, dissolved in a solution of acetone, benzol, and methyl alcohol.

7. The process of manufacturing dye which comprises combining bichlorid of tin with an oil having as a constituent a substantial amount of oil of safrol.

8. The process of manufacturing artificial dye which comprises combining bichlorid of tin with an oil having as a constituent a substantial amount of oil of safrol, at an elevated temperature.

9. The process of manufacturing artificial dye which comprises combining bichlorid of tin with oil of safrol.

In testimony whereof I have signed my name to this specification in the presence of two subscribing witnesses.

FREDERICK REISSMANN.

Witnesses:
C. A. NEALE,
W. T. FITZ GERALD.